(12) United States Patent
Shinohara (10) Patent No.: US 6,650,485 B2
(45) Date of Patent: Nov. 18, 2003

(54) PHOTOGRAPHIC LENS (75) Inventor: Yoshikazu Shinohara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/225,358

(22) Filed: Aug. 22, 2002

(65) Prior Publication Data
US 2003/0117723 A1 Jun. 26, 2003

(30) Foreign Application Priority Data
Sep. 7, 2001 (JP) ......................... 2001-271624

(51) Int. Cl.⁷ .................. G02B 3/06; G02B 13/18; G02B 3/02
(52) U.S. Cl. .......................... 359/717; 359/708
(58) Field of Search ............... 359/708, 713, 359/714, 715, 716, 717

(56) References Cited

U.S. PATENT DOCUMENTS 5,835,288 A * 11/1998 Yamada et al. .......... 359/717
5,917,661 A    6/1999 Tochigi et al.

* cited by examiner

Primary Examiner—Georgia Epps
Assistant Examiner—Alicia M Harrington
(74) Attorney, Agent, or Firm—Arnold International; Bruce Y. Arnold (57) ABSTRACT A compact photographic lens for a digital camera is disclosed. The photographic lens has only two lens elements, yet provides excellent imaging even at the periphery of the image field. The photographic lens of the invention and an image sensor, together, fit within a volume of about 10 cm³. The lens is formed of, in order from the object side, a biconvex lens element having two aspherical surfaces, and a positive meniscus lens element having two aspherical surfaces. The convex surface of the meniscus lens element is positioned on the image side, and various conditions are satisfied in order to provide the photographic lens with a short overall length while favorably correcting various aberrations.

4 Claims, 6 Drawing Sheets

Spherical Aberration
Fig. 6(A)

Astigmatism
Fig. 6(B)

Distortion
Fig. 6(C)

Spherical Aberration
Fig. 7(A)

Astigmatism
Fig. 7(B)

Distortion
Fig. 7(C)

Spherical Aberration
Fig. 8(A)

Astigmatism
Fig. 8(B)

Distortion
Fig. 8(C)

Spherical Aberration
Fig. 9(A)

Astigmatism
Fig. 9(B)

Distortion
Fig. 9(C)

Spherical Aberration
Fig. 10(A)

Astigmatism
Fig. 10(B)

Distortion
Fig. 10(C)

PHOTOGRAPHIC LENS

BACKGROUND OF THE INVENTION

Recently, electronic devices that use image sensors, such as CCD arrays, etc., have also been miniaturized along with the trend to miniaturize the image sensors. For example, the miniaturization of electronic devices which use such image sensors, such as portable module cameras and WEB cameras, etc., is striking. The portable module camera is a camera used in a portable telephone, etc., and the WEB camera is a camera used for transmission of image data via the Internet. Many photographic lenses used in these small electronic devices also emphasize smallness and portability and are constructed by using only one lens element.

Recently, the performance of image sensors has improved and a large number of pixels (e.g., about 350,000 pixels) have become available for capturing even small images. Along with such a high number of image elements, higher optical performance than before is also required for photographic lenses which form the images. Thus, a problem has arisen in that a sufficient optical imaging performance cannot be obtained using a one-piece lens construction. Particularly, there is a problem in that the optical performance at the periphery of an image markedly deteriorates when using a single lens element construction. This deterioration of performance at the periphery of an image is attributed to astigmatism, i.e., a difference in imaging positions of light imaged in the sagittal image plane versus the tangential image plane.

Accordingly, it has been considered that the number of lens elements be increased to two in order to obtain a sufficient optical performance so as to match the details detectable by the large number of image elements of recently developed image sensors. The use of a negative lens element combined with a positive lens element has been tried in the past as photographic lenses of a two-piece construction. However, few of such conventional photographic lenses of two-piece construction have a sufficient compactness in overall length. Accordingly, the need for development of photographic lenses suitable for use with compact image sensors having a high number of image elements, i.e., photographic lenses which have improved optical performance without extending the overall length of the photographic lens, has increased. For example, the development of small, yet high-performance, photographic lenses which are no larger in size than about 10 cm$^3$, including the image sensor, is desired.

BRIEF SUMMARY OF THE INVENTION

The object of the invention is to provide a photographic lens which enables the overall length of the lens to be shortened and, more particularly, to provide a lens having only two lens elements and which provides an improved optical performance at the periphery of the image field as compared to a photographic lens formed of a single lens element.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to a photographic lens which is mainly used in small electronic devices having an image sensor chip, such as found in a portable module camera, a WEB camera, and so on. The photographic lens according to the invention is formed of only two lens elements. In order from the object side, these are: a biconvex lens element having two aspherical surfaces, and a positive meniscus lens element having two aspherical surfaces and with its convex surface on the image side. The aspherical surfaces have a shape that is defined by the following Equations (A) and (B):

$$f(\rho)=[C\rho^2/\{1+(1-K\ C^2\rho^2)^{1/2}\}]+A_4\rho^4+A_6\rho^6+A_8\rho^8+A_{10}\rho^{10} \quad \text{Equation (A)}$$

and $$\rho^2=x^2+y^2 \quad \text{Equation (B)}$$

where

ρ is measured in a direction perpendicular to the optical axis Z0; as per Equation (B), with x and y being coordinate points on respective X and Y coordinate axes that are each perpendicular to the optical axis Z0 and to one another, C(=1/R) is the reciprocal of the radius of curvature R of the aspherical surface near the optical axis, x and y are coordinate points on the X and Y axis, respectively, which are each perpendicular to the optical axis Z0 and to each other;

K is the eccentricity, and $A_4, A_6, A_8, A_{10}$ are the respective aspherical coefficients of ρ raised to the fourth, sixth, eighth and tenth powers, respectively.

The aspherical surface is a curved surface obtained by rotating a curve defined by Equation (A) around the optical axis Z0.

According to a first feature of the invention, the following Conditions (1) and (2) are satisfied:

$2 \cdot dd2 < dd1$      Condition (1)

$|R3| < |R4|$      Condition (2)

where, dd1 is the on-axis distance between the object-side surface and the image-side surface of the biconvex lens element, dd2 is the on-axis distance between the image-side surface of the biconvex lens element and the object-side surface of the positive meniscus lens element,

|R3| is the absolute value of the radius of curvature of the image-side surface of the biconvex lens element, and

|R4| is the absolute value of the radius of curvature of the object-side surface of the meniscus lens element.

By such a construction and by satisfying Conditions (1) and (2), various aberrations are favorably corrected and optical performance is improved as compared with that of a conventional photographic lens that is formed of only a single lens element. Furthermore, despite there being two lens elements in the photographic lens of the present invention, the overall length of the photographic lens of the present invention is small.

It is desirable that the image-side aspherical surface of the meniscus lens element be shaped so that it has a positive refractive power near the optical axis and a negative refractive power near its periphery. This facilitates matching the imaging positions of the sagittal image plane light and the tangential image plane light.

In order to reduce the lateral color of the photographic lens, it is desirable that the present invention also satisfy the following Conditions (3) and (4):

$vd1 > 50$      Condition (3)

$vd2 < 35$      Condition (4)

where vd1 is the Abbe number, at the d line, of the biconvex lens element, and vd2 is the Abbe number, at the d line, of the meniscus lens element.

Figure 1:
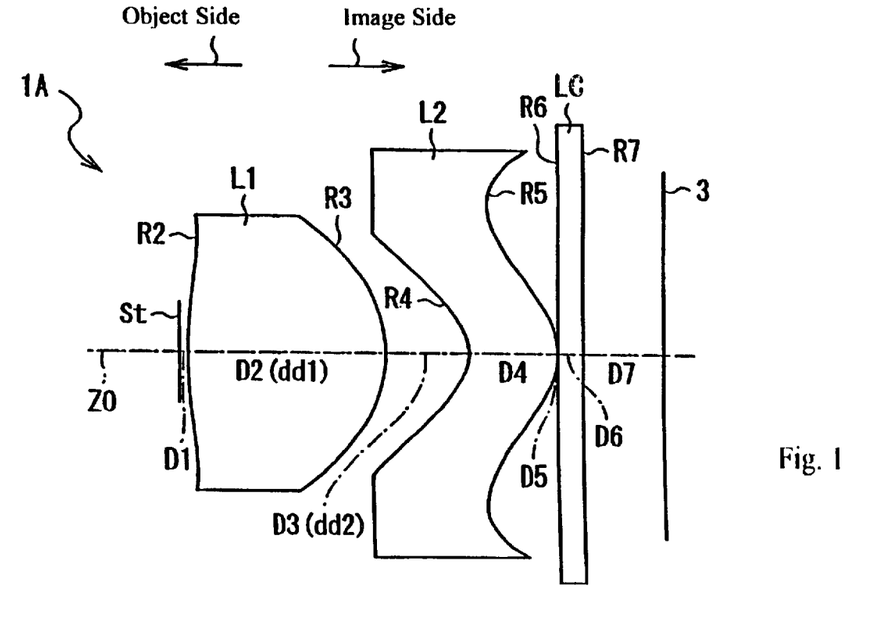
FIG. 1 is a sectional view showing a photographic lens according to Embodiment 1.

The invention will first be described in general terms. Referring to FIG. 1, which is fairly-well representative of the overall invention despite being specifically drawn to the first embodiment of the invention, the photographic lens 1A is formed of only two lens elements L1, L2 arranged in order from the object side along the optical axis Z0. A stop St is provided on the object side of the first lens element L1. A cover glass LC may be arranged on the image side of the second lens element L2, as desired. The cover glass LC serves to protect the image pickup surface of an image sensor, such as a CCD array. For convenience of illustration, the cover glass LC is shown as being positioned to the left side of the imaging plane 3; however, it actually is positioned with a surface in contact with an image sensor surface that is positioned at the image plane.

If Condition (1) is not satisfied the on-axis distance between the two lens elements L1 and L2 increases, thus increasing the overall length of the lens. Also certain aberrations increase.

If Condition (2) is not satisfied the sagittal image plane and the tangential image plane separate and distortion increases. Moreover, the amount of light in the periphery of an image will decrease.

By making the lens elements L1 and L2 of different optical material so as to satisfy Conditions (3) and (4), lateral color is favorably corrected.

Various embodiments of the invention will now be set forth in detail.

Embodiment 1

As mentioned previously, FIG. 1 illustrates a photographic lens according to Embodiment 1 of the present invention. As the components have already been discussed further discussion will be omitted.

Table 1 below lists the surface number #, in order from the object side, the radius of curvature R (in mm) near the optical axis of each surface, the on-axis distance D (in mm) between surfaces, as well as the index of refraction $N_d$ and the Abbe number $v_d$ (both at the d-line, i.e., $\lambda = 587.6$ nm) of the optical material of the lens elements of Embodiment 1 of the invention. In the bottom portion of the Table is listed the focal length f of the photographic lens. Those surfaces that have an asterisk to the right of the surface number in Table 1 are aspherical, having a shape as set forth in Equations (A) and (B) above.

TABLE 1

| # | R | D | $N_d$ | $v_d$ |
|---|---|---|---|---|
| 1 | ∞ (stop) | 0.1 | | |
| 2* | 4.5248 | 2.46558 (dd1) | 1.53105 | 55.5 |
| 3* | −1.4766 | 1.03908 (dd2) | | |
| 4* | −0.5828 | 1.10729 | 1.53105 | 55.5 |
| 5* | −0.8074 | 0 | | |
| 6 | ∞ | 0.3 | 1.51633 | 64.2 |
| 7 | ∞ | 1.03326 | | |
| 8 | ∞ (Img) | | | | f = 3.5 mm

Table 2 below lists the constants of the aspherical surfaces, where the letter "E" following a number indicates that the number which follows is the exponent to the base 10. For example, 1.0E−02 represents the number $1.0 \times 10^{-2}$.

TABLE 2

| # | C | K | $A_4$ | $A_6$ | $A_8$ | $A_{10}$ |
|---|---|---|---|---|---|---|
| 2 | 0.2210 | −27.3400 | 4.7168E−03 | −5.5410E−03 | 3.0989E−06 | 5.7558E−07 |
| 3 | −0.6772 | −1.4276 | −4.4337E−02 | −2.4288E−04 | −8.3349E−07 | −2.3121E−09 |
| 4 | −1.7160 | −0.4247 | 1.8005E−02 | 9.8555E−05 | 3.5042E−07 | 1.0007E−09 |
| 5 | −1.2385 | −0.6372 | 3.9521E−02 | 5.2552E−04 | 2.5703E−05 | 3.1260E−07 |

Figure 6A:
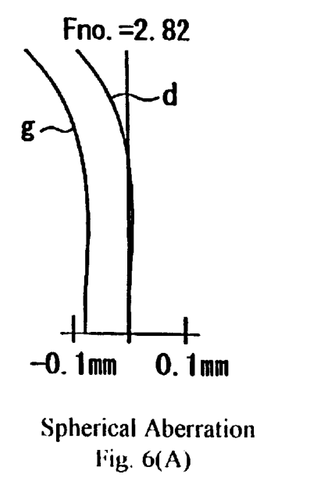
FIGS. 6(A)–6(C) show aberrations of the photographic lens of Embodiment 1, with FIG. 6(A) showing the spherical aberration, FIG. 6(B) showing the astigmatism, and FIG. 6(C) showing the distortion.
Figure 6B:
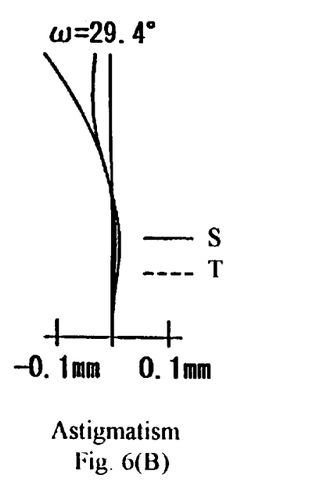
Figure 6C:
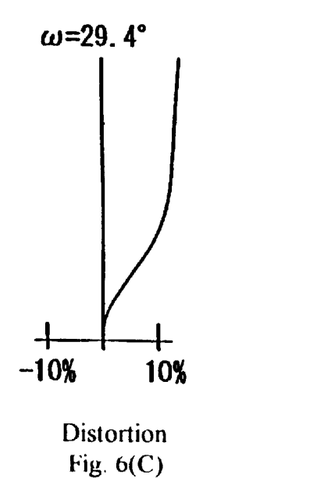

FIGS. 6(A)–6(C) show aberrations of the photographic lens of Embodiment 1, with FIG. 6(A) being the spherical aberration (in mm), FIG. 6(B) being the astigmatism (in mm) for both the sagittal S and tangential T image planes, and FIG. 6(C) being the distortion (in %). In FIG. 6(A), the spherical aberration is given for both the g line ($\lambda = 435.8$ nm) and the d line ($\lambda = 587.6$ nm). In FIGS. 6(B) and 6(C) the aberrations are for the d line, and the half-image angle ω is indicated. In FIG. 6(B) the solid line represents the sagittal image plane aberration and the dotted line represents the tangential image plane aberration. As is apparent from the above data, in this embodiment each of Conditions (1) and (2) is satisfied.

Embodiment 2

As mentioned previously, FIG. 2 illustrates a photographic lens according to Embodiment 2 of the present invention, which has a basic lens element structure similar to FIG. 1. Thus, further discussion will be omitted.

Figure 2:
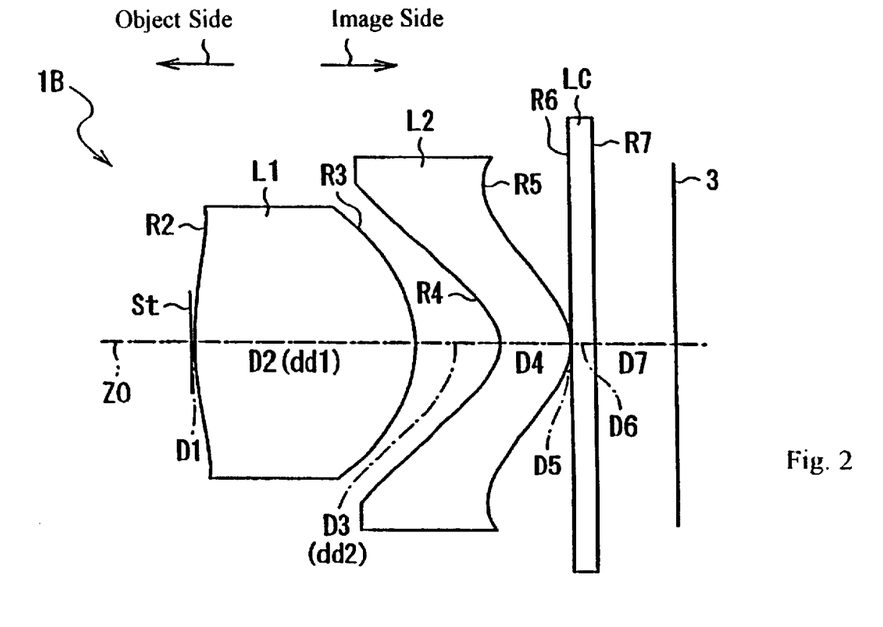
FIG. 2 is a sectional view showing a photographic lens according to Embodiment 2.

Table 3 below lists the surface number #, in order from the object side, the radius of curvature R (in mm) near the optical axis of the surface, the on-axis distance D (in mm) between surfaces, as well as the index of refraction $N_d$ and the Abbe number $v_d$ (both at the d-line, i.e., $\lambda$=587.6 nm) of the optical material of the lens elements of Embodiment 2 of the invention. In the bottom portion of the Table is listed the focal length f of the photographic lens. Those surfaces that have an asterisk to the right of the surface number in Table 3 are aspherical, having a shape as set forth in Equations (A) and (B) above.

TABLE 3

| # | R | D | $N_d$ | $v_d$ |
|---|---|---|---|---|
| 1 | ∞ (stop) | 0.05 | | |
| 2* | 4.3883 | 2.74817 (dd1) | 1.531029 | 55.5 |
| 3* | −1.4487 | 1.05586 (dd2) | | |
| 4* | −0.4913 | 0.88726 | 1.531029 | 55.5 |
| 5* | −0.6961 | 0 | | |
| 6 | ∞ | 0.3 | 1.516312 | 64.2 |
| 7 | ∞ | 1.00383 | | |
| 8 | ∞ (Img) | | | | f = 3.52 mm

Table 4 below lists the constants of the aspherical surfaces, where the letter "E" following a number indicates that the number which follows is the exponent to the base 10. For example, 1.0E-02 represents the number $1.0 \times 10^{-2}$.

TABLE 4

| # | C | K | $A_4$ | $A_6$ | $A_8$ | $A_{10}$ |
|---|---|---|---|---|---|---|
| 2 | 0.2279 | −16.9453 | 6.3449E−03 | −5.5390E−03 | 3.1005E−06 | 5.7561E−07 |
| 3 | −0.6903 | −1.4734 | −3.4053E−02 | −1.6542E−04 | −5.2226E−07 | −1.3722E−09 |
| 4 | −2.0353 | −0.4890 | 1.5330E−02 | 7.4376E−05 | 2.4721E−07 | 6.9815E−10 |
| 5 | −1.4365 | −0.6705 | 3.1650E−02 | 4.9449E−04 | 2.5647E−05 | 3.1272E−07 |

Figure 7A:
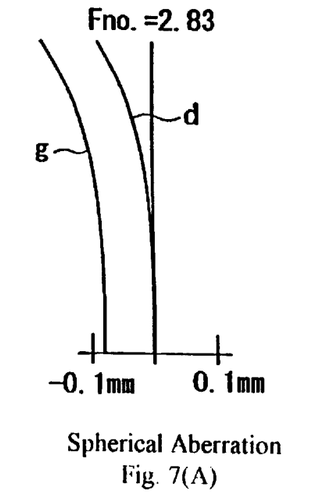
FIGS. 7(A)–7(C) show aberrations of the photographic lens of Embodiment 2, with FIG. 7(A) showing the spherical aberration, FIG. 7(B) showing the astigmatism, and FIG. 7(C) showing the distortion.
Figure 7B:
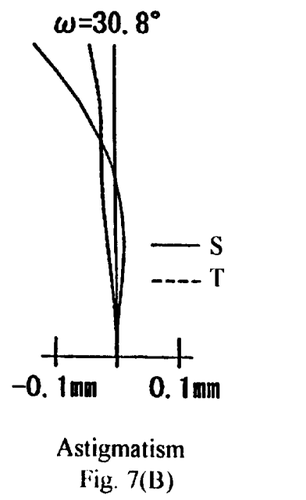
Figure 7C:
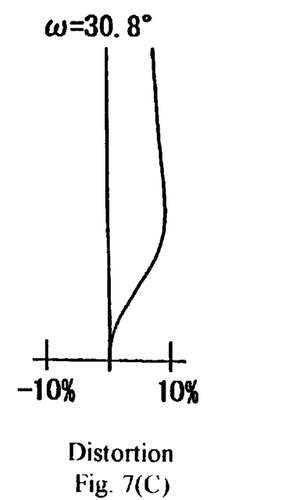

FIGS. 7(A)–7(C) show aberrations of the photographic lens of Embodiment 2, with FIG. 7(A) being the spherical aberration (in mm), FIG. 7(B) being the astigmatism (in mm) for both the sagittal S and tangential T image planes, and FIG. 7(C) being the distortion (in %). In FIG. 7(A), the spherical aberration is given for both the g line ($\lambda$=435.8 nm) and the d line ($\lambda$=587.6 nm). In FIGS. 7(B) and 7(C) the aberrations are for the d line, and the half-image angle $\omega$ is indicated. As is apparent from the above data, in this embodiment the aberrations are favorably corrected, and each of Conditions (1) and (2) is satisfied.

Embodiment 3

As mentioned previously, FIG. 3 illustrates a photographic lens according to Embodiment 3 of the present invention, which has a basic lens element structure similar to FIG. 1. Thus, further discussion will be omitted.

Figure 3:
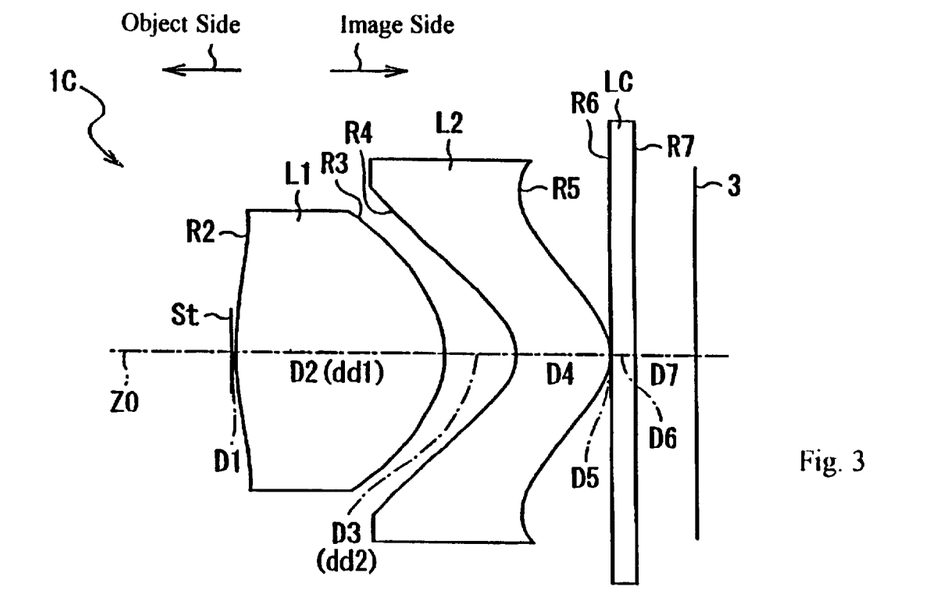
FIG. 3 is a sectional view showing a photographic lens according to Embodiment 3.

Table 5 below lists the surface number #, in order from the object side, the radius of curvature R (in mm) near the optical axis of the surface, the on-axis distance D (in mm) between surfaces, as well as the index of refraction $N_d$ and the Abbe number $v_d$ (both at the d-line, i.e. $\lambda$=587.6 nm) of the optical material of the lens elements of Embodiment 3 of the invention. In the bottom portion of the Table is listed the focal length f of the photographic lens. Those surfaces that have an asterisk to the right of the surface number in Table 5 are aspherical, having a shape as set forth in Equations (A) and (B) above.

TABLE 5

| # | R | D | $N_d$ | $v_d$ |
|---|---|---|---|---|
| 1 | ∞ | 0.05 | | |
| 2* | 4.1399 | 2.54477 (dd1) | 1.531029 | 55.5 |
| 3* | −1.2428 | 0.87945 (dd2) | | |
| 4* | −0.4995 | 1.15749 | 1.531029 | 55.5 |
| 5* | −0.6035 | 0 | | |
| 6 | ∞ | 0.3 | 1.516312 | 64.2 |
| 7 | ∞ | 0.74984 | | |
| 8 | ∞ (Img) | | | | f = 2.8 mm

Table 6 below lists the constants of the aspherical surfaces, where the letter "E" following a number indicates that the number which follows is the exponent to the base 10. For example, 1.0E-02 represents the number $1.0 \times 10^{-2}$.

TABLE 6

| # | C | K | $A_4$ | $A_6$ | $A_8$ | $A_{10}$ |
|---|---|---|---|---|---|---|
| 2 | 0.2416 | −16.7875 | 6.3491E−03 | −5.5390E−03 | 3.1005E−06 | 5.7561E−07 |
| 3 | −0.8046 | −0.9488 | −3.4059E−02 | −1.6547E−04 | −5.2245E−07 | −1.3727E−09 |
| 4 | −2.0019 | −0.4916 | 1.5323E−02 | 7.4362E−05 | 2.4722E−07 | 6.9822E−10 |
| 5 | −1.6571 | −0.7550 | 3.1674E−02 | 4.9464E−04 | 2.5648E−05 | 3.1273E−07 |

Figure 8A:
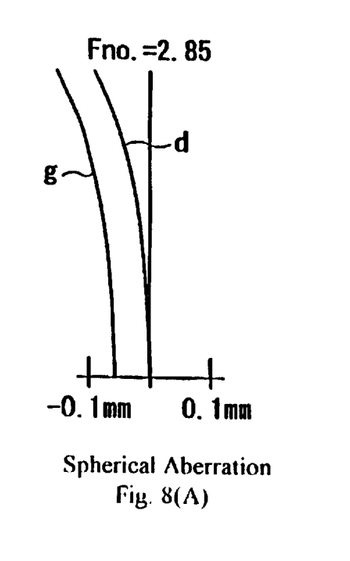
FIGS. 8(A)–8(C) show aberrations of the photographic lens of Embodiment 3, with FIG. 8(A) showing the spherical aberration, FIG. 8(B) showing the astigmatism, and FIG. 8(C) showing the distortion.
Figure 8B:
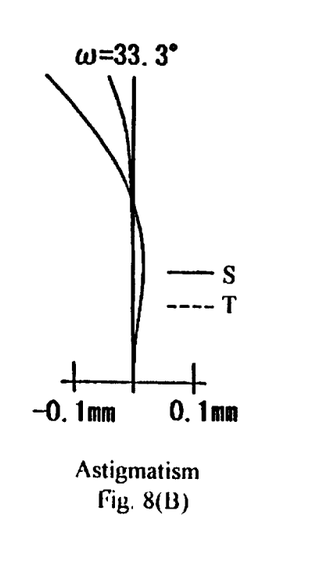
Figure 8C:
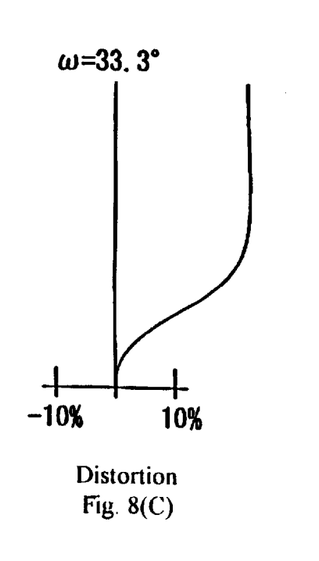

FIGS. 8(A)–8(C) show aberrations of the photographic lens of Embodiment 3, with FIG. 8(A) being the spherical aberration (in mm), FIG. 8(B) being the astigmatism (in mm) for both the sagittal S and tangential T image planes, and FIG. 8(C) being the distortion (in %). In FIG. 8(A), the spherical aberration is given for both the g line ($\lambda$=435.8 nm)

and the d line (λ=587.6 nm). In FIGS. 8(B) and 8(C) the aberrations are for the d line, and the half-image angle ω is indicated. As is apparent from the above data, in this embodiment the aberrations are favorably corrected, and each of Conditions (1) and (2) is satisfied.

Embodiment 4

As mentioned previously, FIG. 4 illustrates a photographic lens according to Embodiment 4 of the present invention, which has a basic lens element structure similar to FIG. 1. Thus, further discussion will be omitted.

Figure 4:
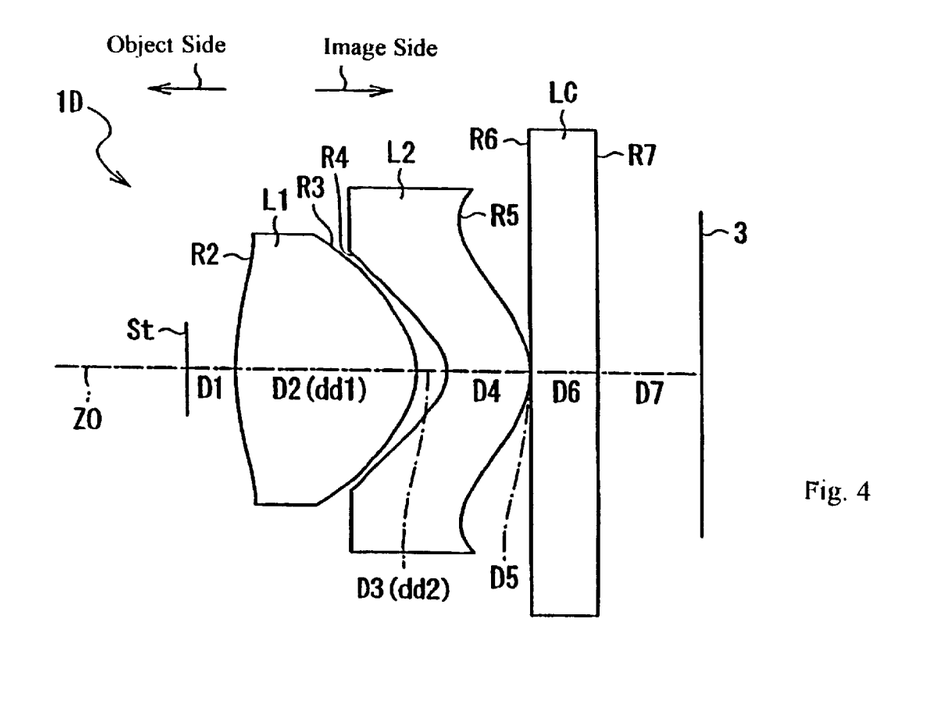
FIG. 4 is a sectional view showing a photographic lens according to Embodiment 4.

Table 7 below lists the surface number #, in order from the object side, the radius of curvature R (in mm) near the optical axis of the surface, the on-axis distance D (in mm) between surfaces, as well as the index of refraction $N_d$ and the Abbe number $v_d$ (both at the d-line, i.e., λ=587.6 nm) of the optical material of the lens elements of Embodiment 4 of the invention. In the bottom portion of the Table is listed the focal length f of the photographic lens. Those surfaces that have an asterisk to the right of the surface number in Table 7 are aspherical, having a shape as set forth in Equations (A) and (B) above.

TABLE 7

| # | R | D | $N_d$ | $v_d$ |
|---|---|---|---|---|
| 1 | ∞ (stop) | 0.3944 | | |
| 2* | 2.2630 | 1.4900 (dd1) | 1.53105 | 55.5 |
| 3* | −0.6000 | 0.2516 (dd2) | | |
| 4* | −0.3228 | 0.6979 | 1.583641 | 30.2 |
| 5* | −0.6211 | 0.0000 | | |
| 6 | ∞ | 0.5500 | 1.516798 | 64.2 |
| 7 | ∞ | 0.8456 | | |
| 8 | ∞ (Img) | | | | f = 2.1 mm

Table 8 below lists the constants of the aspherical surfaces, where the letter "E" following a number indicates that the number which follows is the exponent to the base 10. For example, 1.0E-02 represents the number $1.0 \times 10^{-2}$.

TABLE 8

| # | C | K | $A_4$ | $A_6$ | $A_8$ | $A_{10}$ |
|---|---|---|---|---|---|---|
| 2 | 0.4419 | −4.70921 | 1.2952E−02 | −4.6046E−02 | 6.0066E−05 | 2.6023E−05 |
| 3 | −1.6667 | −1.41564 | −1.4771E−01 | −2.0134E−03 | −1.6147E−05 | −1.0452E−07 |
| 4 | −3.0979 | −0.57437 | 5.9928E−02 | 8.1765E−04 | 6.7898E−06 | 4.5253E−08 |
| 5 | −1.6100 | −0.37642 | 1.5125E−01 | 4.3679E−03 | 4.9820E−04 | 1.4133E−05 |

Figures 9A, 9B:
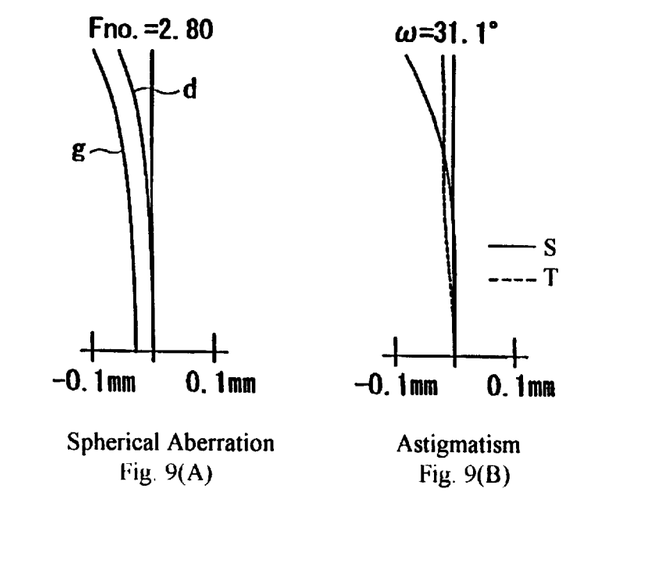
FIGS. 9(A)–9(C) show aberrations of the photographic lens of Embodiment 4, with FIG. 9(A) showing the spherical aberration, FIG. 9(B) showing the astigmatism, and FIG. 9(C) showing the distortion.
Figure 9C:
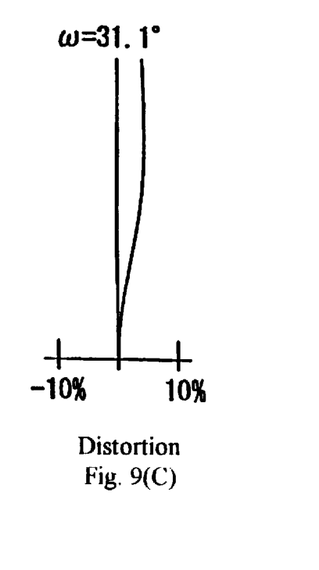

FIGS. 9(A)–9(C) show aberrations of the photographic lens of Embodiment 4, with FIG. 9(A) being the spherical aberration (in mm), FIG. 9(B) being the astigmatism (in mm) for the both the sagittal S and tangential T image planes, and FIG. 9(C) being the distortion (in %). In FIG. 9(A), the spherical aberration is given for both the g line (λ=435.8 nm) and the d line (λ587.6 nm). In FIGS. 9(B) and 9(C) the aberrations are for the d line, and the half-image angle ω is indicated. As is apparent from the above data, in this embodiment the aberrations are favorably corrected, and each of Conditions (1)–(4) is satisfied.

Embodiment 5

As mentioned previously, FIG. 5 illustrates a photographic lens according to Embodiment 5 of the present invention, which has a basic lens element structure similar to FIG. 1. Thus, further discussion will be omitted.

Figure 5:
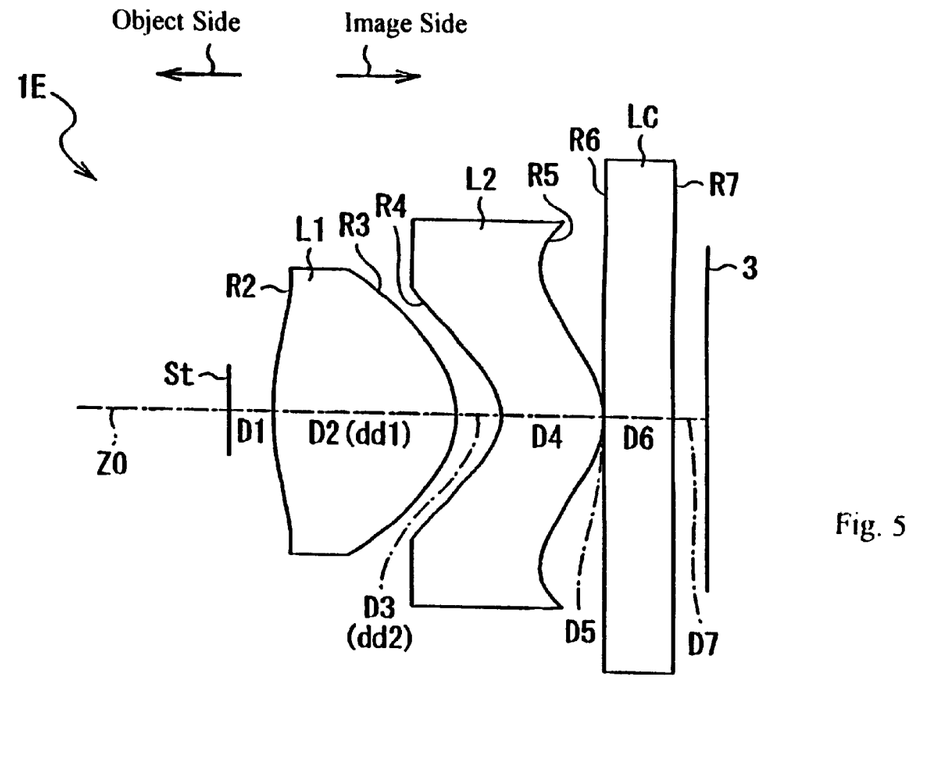
FIG. 5 is a sectional view showing a photographic lens according to Embodiment 5.

Table 9 below lists the surface number #, in order from the object side, the radius of curvature R (in mm) near the optical axis of each surface, the on-axis distance D (in mm) between surfaces, as well as the index of refraction $N_d$ and the Abbe number $v_d$ (both at the d-line, i.e., λ=587.6 nm) of the optical material of the lens elements of Embodiment 5 of the invention. In the bottom portion of the Table is listed the focal length f of the photographic lens. Those surfaces that have an asterisk to the right of the surface number in Table 9 are aspherical, having a shape as set forth in Equations (A) and (B) above.

TABLE 9

| # | R | D | $N_d$ | $v_d$ |
|---|---|---|---|---|
| 1 | ∞ (stop) | 0.3446 | | |
| 2* | 2.0860 | 1.4277 (dd1) | 1.531029 | 55.5 |
| 3* | −0.6000 | 0.3565 (dd2) | | |
| 4* | −0.3489 | 0.7996 | 1.583599 | 30.5 |
| 5* | −0.6158 | 0.0000 | | |
| 6 | ∞ | 0.5500 | 1.51678 | 64.2 |
| 7 | ∞ | 0.2803 | | |
| 8 | ∞ (Img) | | | | f = 1.93 mm

Table 10 below lists the constants of the aspherical surfaces, where the letter "E" following a number indicates that the number which follows is the exponent to the base 10. For example, 1.0E-02 represents the number $1.0 \times 10^{-2}$.

TABLE 10

| # | C | K | $A_4$ | $A_6$ | $A_8$ | $A_{10}$ |
|---|---|---|---|---|---|---|
| 2 | 0.3916 | −26.9387 | 2.5715E−02 | −9.3289E−02 | 1.6142E−04 | 9.2758E−05 |
| 3 | −1.6091 | −0.9142 | −2.4149E−01 | −4.0915E−03 | −4.3428E−05 | −3.7265E−07 |
| 4 | −2.9153 | −0.6239 | 9.8149E−02 | 1.6608E−03 | 1.8262E−05 | 1.6129E−07 |
| 5 | −2.3267 | −0.5803 | 2.1490E−01 | 8.8441E−03 | 1.3388E−03 | 5.0377E−05 |

Figure 10A:
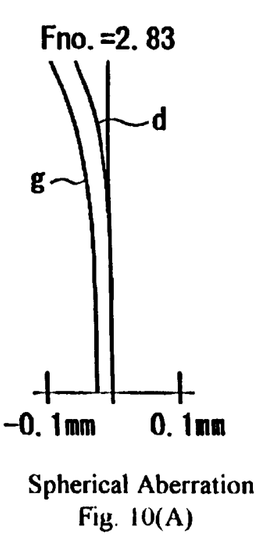
FIGS. 10(A)–10(C) show aberrations of the photographic lens of Embodiment 5, with FIG. 10(A) showing the spherical aberration, FIG. 10(B) showing the astigmatism, and FIG. 10(C) showing the distortion.
Figure 10B:
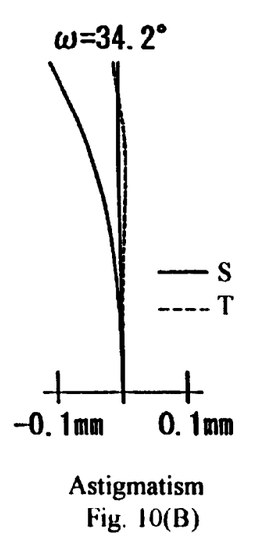
Figure 10C:
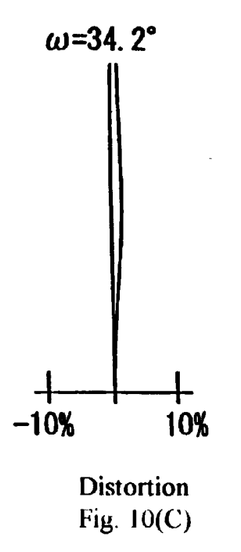

FIGS. 10(A)–10(C) show aberrations of the photographic lens of Embodiment 5, with FIG. 10(A) being the spherical aberration (in mm), FIG. 10(B) being the astigmatism (in mm) for both the sagittal S and tangential T image planes, and FIG. 10(C) being the distortion (in %). In FIG. 10(A), the spherical aberration is given for both the g line ($\lambda$=435.8 nm) and the d line ($\lambda$=587.6 nm). In FIGS. 10(B) and 10(C) the aberrations are for the d line, and the half-image angle $\omega$ is indicated. As is apparent from the above data, in this embodiment the aberrations are favorably corrected, and each of Conditions (1)–(4) is satisfied.

The invention being thus described, it will be obvious that the same may be varied in many ways. For example, the values of the radius of curvature R, surface spacing D, refractive index $N_d$ and Abbe numbers $\nu_d$. etc. are not limited to the numbers shown by the above numerical embodiment examples, and other values can be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A photographic lens having only two lens elements, said photographic lens comprising, in order from the object side:

a biconvex lens element having two aspherical surfaces; and a positive meniscus lens element having two aspherical surfaces and with its convex surface on the image side; wherein the following Conditions (1) and (2) are satisfied:

$2*dd2 < dd1$   Condition (1)

$|R3| < |R4|$   Condition (2)

where, dd1 is the on-axis distance between the object-side surface and the image-side surface of the biconvex lens element, dd2 is the on-axis distance between the image-side surface of the biconvex lens element and the object-side surface of the positive meniscus lens element,

|R3| is the absolute value of the radius of curvature of the image-side surface of the biconvex lens element, and

|R4| is the absolute value of the radius of curvature of the object-side surface of the meniscus lens element.

2. The photographic lens as described in claim 1, wherein the image-side aspherical surface of the positive meniscus lens element is shaped so that the positive refractive power of this lens element becomes weaker towards the periphery of the lens element.

3. The photographic lens described in claim 1, wherein the following Conditions (3) and (4) are also satisfied:

$nd1 > 50$   Condition (3)

$\nu d2 < 35$   Condition (4)

where $\nu d1$ is the Abbe number at the d line of the biconvex lens element, and $\nu d2$ is the Abbe number at the d line of the meniscus lens element.

4. The photographic lens described in claim 2, wherein the following Conditions (3) and (4) are also satisfied:

$\nu d1 > 50$   Condition (3)

$\nu d2 < 35$   Condition (4)

where $\nu d1$ is the Abbe number at the d line of the biconvex lens element, and $\nu d2$ is the Abbe number at the d line of the meniscus lens element.

* * * * *

UNITED STATES PATENT AND TRADEMARK OFFICE
CERTIFICATE OF CORRECTION

PATENT NO.     : 6,650,485 B2
DATED          : November 18, 2003
INVENTOR(S)    : Shinohara It is certified that error appears in the above-identified patent and that said Letters Patent is hereby corrected as shown below:

<u>Column 7,</u>
Line 67, change "d line (λ587.6 nm)." to -- d line (λ=587.6 nm). --; and <u>Column 9,</u>
Line 29, change "2 * dd2 < dd1       ... Condition (1)" to
          -- 2 · dd2 < dd1 --         ... Condition (1) --.

Signed and Sealed this

Third Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,650,485 B2
DATED : November 18, 2003
INVENTOR(S) : Shinohara

It is certified that error appears in the above-identified patent and that said Letters Patent is hereby corrected as shown below:

Title page,
Item [57], ABSTRACT,
Line 8, change "positive" to -- negative --.

Column 2,
Line 37, change "positive" to -- negative --.

Column 3,
Line 6, change "|R3|<|R4|" to -- R3<R4 --;
Line 14, change "positive" to -- negative --;
Line 15, change "|R3| is the absolute" to -- R3 is the --; and
Line 17, change "|R4| is the absolute" to -- R4 is the --.

Column 9,
Line 25, change "positive" to -- negative --; and
Line 31, change "|R3|<|R4|" to -- R3<R4 --;

Column 10,
Line 3, change "positive" to -- negative --;
Line 4, change "|R3| is the absolute" to -- R3 is the --;
Line 6, change "|R4| is the absolute" to -- R4 is the --;
Line 9, change "positive" to -- negative --; and
Line 11, after "of" insert -- the image-side aspherical surface of --.

Signed and Sealed this

Twenty-first Day of February, 2006

JON W. DUDAS
*Director of the United States Patent and Trademark Office*